United States Patent [19]
Humphries, Jr.

[11] Patent Number: 5,622,043
[45] Date of Patent: Apr. 22, 1997

[54] GAS AND STEAM ELECTRICAL POWER GENERATING SYSTEM

[76] Inventor: James J. Humphries, Jr., 67 Ledgeways, Wellesley Hills, Mass. 02181

[21] Appl. No.: 423,796

[22] Filed: Apr. 18, 1995

Related U.S. Application Data

[63] Continuation-in-part of Ser. No. 49,072, Apr. 20, 1993, abandoned.

[51] Int. Cl.$^6$ .................................................. F02C 6/18
[52] U.S. Cl. .................................. 60/39.182; 60/39.464; 60/726; 122/4 D
[58] Field of Search ........................ 122/4 R, 4 D; 60/39.182, 39.464, 39.511, 726, 727

[56] References Cited

U.S. PATENT DOCUMENTS

| | | |
|---|---|---|
| 2,067,834 | 1/1937 | Ericson et al. . |
| 2,095,984 | 10/1937 | Holzwarth . |
| 2,095,991 | 10/1937 | Lysholm . |
| 2,110,422 | 3/1938 | Norguet . |
| 2,115,338 | 4/1938 | Lysholm . |
| 2,162,967 | 6/1939 | Pescara . |
| 2,184,845 | 12/1939 | Noack . |
| 2,268,357 | 12/1941 | Turner . |
| 2,294,700 | 9/1942 | Stroehlen . |
| 2,303,381 | 12/1942 | New . |
| 2,336,232 | 12/1943 | Doran . |
| 2,341,490 | 2/1944 | Traupel . |
| 2,354,213 | 7/1944 | Jendrassik . |
| 2,357,041 | 8/1944 | Woolley . |
| 2,361,887 | 10/1944 | Traupel . |
| 2,370,949 | 3/1945 | Gaisberger . |
| 2,371,889 | 3/1945 | Hermitte . |
| 2,374,510 | 4/1945 | Traupel . |
| 2,401,285 | 5/1946 | Woodward et al. . |
| 2,404,938 | 7/1946 | Armacost et al. . |
| 2,421,387 | 6/1947 | Lysholm . |
| 2,428,136 | 9/1947 | Barr . |
| 2,466,723 | 4/1949 | Mercier et al. . |
| 2,477,184 | 7/1949 | Imbert et al. . |
| 2,478,851 | 8/1949 | Traupel . |
| 2,483,073 | 9/1949 | Strub . |
| 2,486,291 | 10/1949 | Karrer . |
| 2,540,598 | 2/1951 | Ruiz . |
| 2,541,170 | 2/1951 | Mayers et al. . |
| 2,568,787 | 9/1951 | Bosch . |
| 2,605,610 | 8/1952 | Hermitte . |
| 2,613,495 | 10/1952 | Mercier et al. . |
| 2,651,911 | 9/1953 | Sterland . |
| 2,663,144 | 12/1953 | Nordstrom et al. . |
| 2,663,145 | 12/1953 | Waeselynck . |
| 2,663,146 | 12/1953 | Legendre . |
| 3,151,250 | 9/1964 | Carlson . |
| 3,605,406 | 9/1971 | Woolley . |
| 3,867,811 | 2/1975 | Waeselynck . |
| 4,116,005 | 9/1978 | Willyoung ........................ 122/4 D |
| 4,329,842 | 5/1982 | Hoskinson . |
| 4,441,028 | 4/1984 | Lundberg . |
| 4,530,291 | 7/1985 | Wysk .............................. 110/342 |
| 4,540,553 | 9/1985 | Hagiwara et al. ................. 423/230 |
| 4,872,307 | 10/1989 | Nakhamkin . |
| 4,915,037 | 4/1990 | Avidan ............................ 110/342 |

*Primary Examiner*—Louis J. Casaregola
*Attorney, Agent, or Firm*—Fish & Richardson P.C.

[57] ABSTRACT

An electrical power generation plant has a gas turbine subsystem free of a compressor. A compressor subsystem remote from the gas turbine subsystem has an inlet receiving air and an outlet furnishing compressed air. A compressed air line interlinks the outlets and gas turbine subsystem. An aspect or the invention includes combusting sufficient fuel having sulphur content with sufficient limestone to establish a ratio of Ca/S greater than 3.4.

16 Claims, 2 Drawing Sheets

GAS AND STEAM ELECTRICAL POWER GENERATING SYSTEM

The invention relates to electrical power generating plants and is a continuation-in-part application of Ser. No. 08/049,072 filed Apr. 20, 1993 entitled ELECTRICAL POWER GENERATING (now abandoned).

Many power generating plants utilize a gas turbine having a compressor driven by the turbine to drive an electrical generator. Air enters the compressor where it is compressed. The compressed air is mixed with fuel which is ignited in a burn chamber. The burning fuel/air mixture then expands through an expander to rotate the turbine that drives the generator and the compressor.

In combined cycle gas turbine electrical generators, after the hot gas expands through the expander, it is used to heat water to produce steam. The steam drives a steam turbine, which also drives the generator.

A search of the prior art revealed the following U.S. Patents:

U.S. Pat. No. 2,663,145 (Waeselynck)
U.S. Pat. No. 2,663,144 (Nordstrom)
U.S. Pat. No. 2,605,610 (Hermitte)
U.S. Pat. No. 2,540,598 (Ruiz)
U.S. Pat. No. 2,486,291 (Karrer)
U.S. Pat. No. 2,424,387 (Lysholm)

According to the invention, an electrical power generation plant includes a gas turbine generating plant; a separate compressor subsystem; and a compressed air line which delivers compressed air from the compressor subsystem to the burn chamber for mixing with the fuel.

According to one aspect of the invention, the power generating plant comprises a conventional gas turbine generator with the compressor removed. A plenum replaces the compressor and receives compressed air from the compressor subsystem. Hot exhaust gas heats water to create steam which drives a steam turbine which adds power to the generator. Blowoff valves near the plenum blow off compressed air being delivered from the compressor subsystem in the event of sudden loss of electrical load on the generator, thereby preventing system destruction.

The compressor subsystem includes a boiler which heats water to generate steam, and the steam drives a compressor to provide compressed air to the plenum of the gas turbine generator. The compressed air is heated by being passed through a coil within the boiler before being delivered to the plenum.

The gas turbine generator burns clean, relatively expensive, premium fuels, such as natural gas. The boiler of the compressor subsystem burns relatively cheap fuel, such as hydrogen deficient solids, petroleum cokes, chars, coals, refinery bottoms, vacuum bottoms, residual oils, or any combination thereof.

According to an aspect of the invention, sufficient fuel having sulphur is combusted with sufficient limestone to reduce SO2 emission and establish a Ca/S ratio greater than 3.4, preferably within the range of 5.1 to 10.2 and typically about 8.5, to produce an ash with significant free CaO.

Other features, objects, and advantages will become apparent from the following detailed description when read in connection with the accompanying drawings in which.

Figure 1:
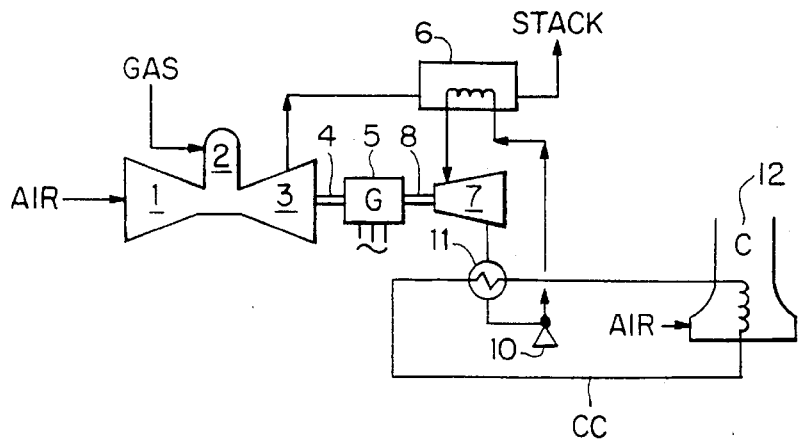
FIG. 1 is a block diagram of a conventional combined cycle combustion turbine electrical generator.

Referring to FIG. 1, in a typical combined cycle combustion turbine generator plant, air is drawn into compressor 1 where it is compressed significantly. One commercially available engine ingests about 2,500,000 pounds of air per hour at sea level and compresses it to about 12.5 atmospheres pressure. The temperature rises to about 700° F.

Most of the compressed air is mixed with fuel and ignited in burn chamber 2. Although only one burn chamber 2 is shown, many commercially available machines have more. The fuel should be gaseous to achieve long hot section life; particulates and certain gases contained in the combustion products of many liquid fuels, and especially in solid fuels, can be extremely damaging to the stator and rotor blades of expander 3. Natural gas (methane) is preferred, as it is both clean burning and available nationwide.

A small portion of the air compressed by compressor 1 bypasses burn chamber 2 and is used to cool the vanes and blades of expander 3. The bypass air and products of combustion within burn chamber 2 are mixed, with an average temperature of about 1900° F., and passed through expander 3. The hot gases expand, and work is extracted. When the gases have almost fully expanded, the temperature is about 980° F., and the pressure is slightly above the pressure at the inlet to compressor 1. The expansion of the hot gases through expander 3 produces about 205,000 KW of shaft work; compressor 1, on the same shaft as expander 3, requires about 120,000 KW to perform its function. This loss leaves a net of 85,000 KW applied to shaft 4, which drives generator 5 to generate electricity. For simplicity, only one generator 5 is shown; most commercially available combined cycle plants have two or more independent generators.

The pressure at the expander exit is sufficient to drive the hot, expanded gas through steam generator 6. The hot gas heats water circulating through steam generator 6, converting the water to steam which passes through and drives steam turbine 7. This produces about 40,000 KW additional power, which is applied to generator 5 via shaft 8. Thus, a total of about 125,000 KW is applied to generator 5.

The water supplying steam generator 6 is circulated through the system by feedwater pump 10. After passing through steam turbine 7, the steam is condensed back to water by condenser 11. Cooling circuit CC and cooling tower 12 are used to eject the heat of condensation.

The mass flow, temperatures, pressures, and power output described above are for a generating plant operating at sea level, with an inlet temperature of 60° F. and a relative humidity of 20%. If ambient temperature increases, power output decreases. If the relative humidity increases, the heat rate increases. If the plant is located above sea level, power output decreases. If the plant is operated at less than full load, the heat rate increases. All combined cycle generating plants exhibit these characteristics.

Figure 2:
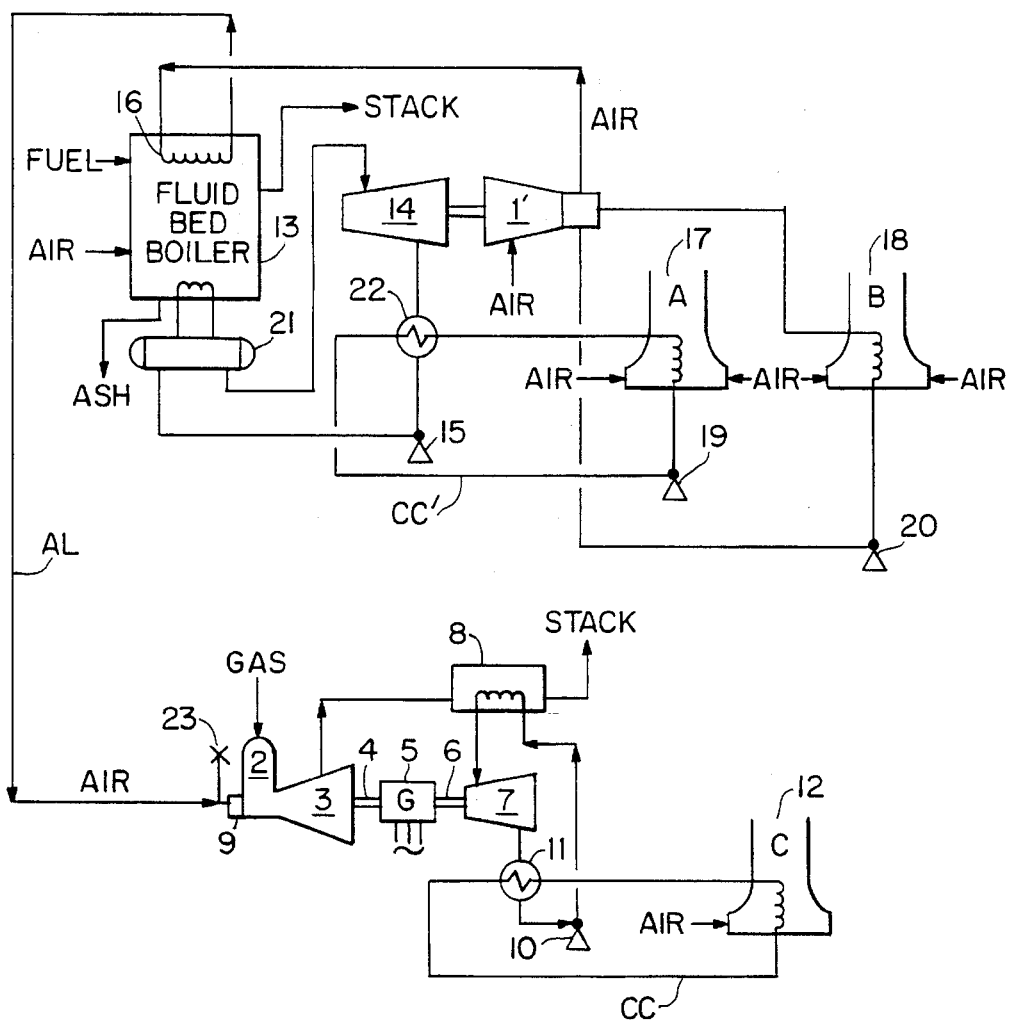
FIG. 2 is a block diagram of a power generating plant according to the invention.

Referring now to FIG. 2, an electrical power generation plant according to the invention is disclosed. The invention makes use of a combined cycle combustion turbine generator plant, as shown in FIG. 1, from which compressor 1 has been removed. Plenum 9 replaces compressor 1 to receive compressed air from the compressor subsystem, to be described below, via compressed air line AL. Preferably, the air delivered to plenum 9 is characterized by the conditions of temperature, pressure, and flow rate produced by compressor 1 in the system of FIG. 1 to take advantage of the design of the combined cycle plant being modified. If these conditions are met, and fuel burn rate in combustor 2 is maintained, combustor 2 and expander 3 performs as if compressor 1 were still present. With compressor 1 removed from the system, the 205,000 KW produced by the expansion of hot gas through expander 3 is all applied to generator 5 through shaft 4. The total power applied to generator 5 is now 245,000 KW (205,000 KW+40,000 KW produced by steam turbine 7).

The compressed air may be supplied to plenum 9 by driving compressor 1, which has been removed, with a steam turbine capable of producing 120,000 KW. Alternatively, the compressed air may be supplied by a compressor subsystem as shown in FIG. 2.

Fluid bed boiler 13 is fired with relatively inexpensive fuels. Any one of, or combination of, the following are equally acceptable: hydrogen deficient solids such as petroleum cokes, chars, coals; very heavy refinery bottoms; vacuum bottoms; and/or residual oils. Water circulating within coil 21 passes through fluid bed boiler 13 and is converted to steam. The steam passes through and drives steam turbine 14, which drives high-efficiency compressor 1'. Although only one steam turbine 14 and high-efficiency compressor 1' are shown, several turbine/compressor assemblies may be provided.

With a currently commercially available high efficiency compressor 1' about 95,000 KW is required from steam turbine 14 to obtain the same flow rate and pressure obtained using replaced compressor 1 (2.5 million pounds/hour; 12.5 atmospheres). High-efficiency compressor 1' does not, however, raise the temperature of the compressed air to the same level as compressor 1 (700° F.). By passing the compressed air through heating coil 16, located within boiler 13, the compressed air receives enough heat to raise its temperature to the appropriate level. The compressed air, now at the levels of mass flow rate, temperature, and pressure for the system of FIG. 1, is supplied to plenum 9 via compressed air line AL.

After passing through and driving steam turbine 14, the steam passes to condenser 22 where it is condensed into condensate which is circulated back to boiler 13 by feedwater pump 15. Water circulated through cooling circuit CC' by pump 19 cools condenser 22, and cooling tower 17 ejects heat from the steam turbine cycle. Cooling tower 18 ejects heat ejected by compressor 1'. In practice, a single cooling tower may perform the functions of cooling towers 12, 17, and 18.

Blowoff valve 23, or a series of valves, is located either on plenum 9, or somewhere along compressed air line AL very near to plenum 9. This safety valve structure prevents destruction of expander 3 in the event of a sudden removal of electrical load from the system. There is then an immediate cutoff of fuel to both burn chamber 2 and boiler 13. In a conventional gas turbine generator as shown in FIG. 1, compressor 1, located on the same shaft as expander 3, provides a braking force which prevents turbine shaft overspeed. In the present invention, there is nothing to brake expander 3. Although steam flowing to steam turbine 14 could be vented before entering it, compressor 1' would still be generating compressed air as it spins down. This air would generate power on shaft 4 with no load, rapidly increasing shaft speed until the unit generator and/or turbine were destroyed. By opening blowoff valve 23 cutting all fuel supplies and venting steam in the compressor subassembly, the invention avoids this destruction.

Blowoff valve 23 also functions as a control device during generator startup. Conventional power generators, as shown in FIG. 1, require a separate starter to initiate spin-up of expander 3 because compressor 1 is physically coupled to expander 3. In the present invention, because the compressor subassembly is decoupled from expander 3, spin-up of the gas turbine is accomplished simply by firing boiler 13. Steam begins to flow, and compressor 1' begins to deliver air to plenum 9. Because generator 5 is not loaded until shaft 4 reaches synchronization speed, there is no load on the system to prevent overspeed, which can be catastrophic as described above. Blowoff valve 23 allows an operator to regulate the quantity and pressure of air being delivered to plenum 9, thereby preventing shaft overspeed and destruction.

Having described a novel electrical power generation plant according to the invention, other advantages and benefits will be described.

By separating the compressor from the gas turbine, the work required to compress the air is no longer provided by the burning of relatively expensive gas turbine fuel; rather, it is provided by the relatively inexpensive fuel used to drive the steam cycle driving the remote compressor. Cost savings are readily obtainable. Fuel costs per KWH, which ordinarily increase with decreased electrical load on the generator, tend to remain constant, if not improve, with reduced electrical load. An electrical generating power plant according to the invention is essentially flat-rated. Changes in air density, whether effected by changes in temperature, altitude, or humidity, have much less impact on system performance than in a conventional, combined cycle gas turbine generator.

In a generating plant employing a conventional steam cycle—such as the steam cycle used to drive steam turbine 14—the boilers typically burn relatively inexpensive fuels, including hydrogen deficient solids such as cokes, chars, coals, and very heavy refinery bottoms. The construction costs of steam plants are high, and as they generate less than their nominal maximum power output, their heat rate and fuel cost per KWH rise. Furthermore, ramping rates on solid fuel-, coke-, coal- and char-fed boiler cycles are low, as compared to gas turbine engines. Nevertheless, considering their relatively low fuel costs, steam cycle-based plants may be economically justified if they are base loaded for their operating lifetime and not cycled extensively.

Combined cycle generators have very high cycle efficiencies, but with higher fuel costs than conventional solid fuel boiler plants. Unlike boiler-based cycles, combined cycles can be ramped rapidly. Like boiler-based cycles, heat rate and fuel cost per KWH increase with decreased loading.

Changes in ambient air density affect combined cycle net production of power. Because the turbine spins at a set generator synchronization speed, the compressor delivers essentially a constant volume of air. Given a maximum turbine inlet temperature, however, power output depends upon the mass of air flowing through the turbine. Therefore, as ambient air density decreases, power output decreases. Furthermore, the compression work is supplied by the burning expansion of air into which an expensive, clean fuel has been injected to provide enthalpy above that provided by the compression itself. With a given mass flow rate of air through the compressor and a given compressor efficiency, to achieve greater turbine power output requires increasing the enthalpy of the burned air; i.e., burning more of the expensive fuel.

Conversely, to reduce power, fuel input is reduced, reducing enthalpy to and expansion work from the expander. The compressor work remains constant, however. Therefore, heat rate rises sharply as power output decreases.

By separating the compressor from the turbine according to the invention, essentially all of the work created by the combustion of the expensive, premium gas turbine fuel is converted to electrical energy by the generator. The energy for driving the remote compressor is supplied by the cheaper fuels used to fire the steam boiler to effect significant cost savings.

Furthermore, boiler 13 may be fired at a design firing rate which allows steam turbine 14 to furnish essentially constant power. As ambient temperature and/or humidity change, affecting air density, steam turbine 14 driving compressor 1' changes speed to maintain design mass flow to plenum 9 and gas turbine 3. With constant mass flow, the combustion turbine is essentially flat rated, regardless of changes in the ambient conditions.

With boiler 14 operating at design heat input rate and delivering air at the proper mass, pressure, and temperature to plenum 9, steam turbine 7 generates about 30% of the rated shaft work to generator 5, even without any fuel input to burn chamber 2. The heat rate is then high, but with very inexpensive fuel in boiler 13, the cost of generation per KWH is lower than even the best combined cycle plant as long as the differential between the cost of gas and the cost of boiler fuel is about $1.00 per MM BTU. As power increases are needed, gas is added to combustion chamber 2. At full power, the cost of power production is less than that of the best combined cycle at a fuel cost differential of about $0.90 per MM BTU.

Another feature of the invention is a turndown capability of from 100% to about 30% that is stable and controllable over the entire range. It has a ramping rate equal to that of a combined cycle and exhibits a constant, if not declining, cost per KWH over the entire turndown ratio. Power output is relatively unaffected by air density changes.

Still another feature of the invention is the addition of more limestone to the normal beds in fluid bed boiler 13 than is needed to reduce SO2 discharge adequately. Adding limestone (sometimes referred to as stone hereafter) to the normal beds controls SO2 discharge. The stone first calcines to CaO, and the CaO reacts with oxygen in the furnace air and then further reacts with the SO2 formed when the S in the coke burns.

Disposal of ash material from burning fuel, typically coke, has been a problem, and the typical prior art approach adds just enough limestone to the fuel bed to get the desired SO2 capture, thereby minimizing ash production. This typical approach uses just enough stone to get a Ca (in the stone) to S (in the coke, coal or other fuel having S) atomic ratio of 1.7 Ca/S. This ratio results in capturing sufficient SO2 to meet pollution regulations.

It has been discovered that by increasing this ratio and adding more stone, thus putting free CaO in the material, results in creating a series of new products of value that is a function of free CaO content.

Figure 3:
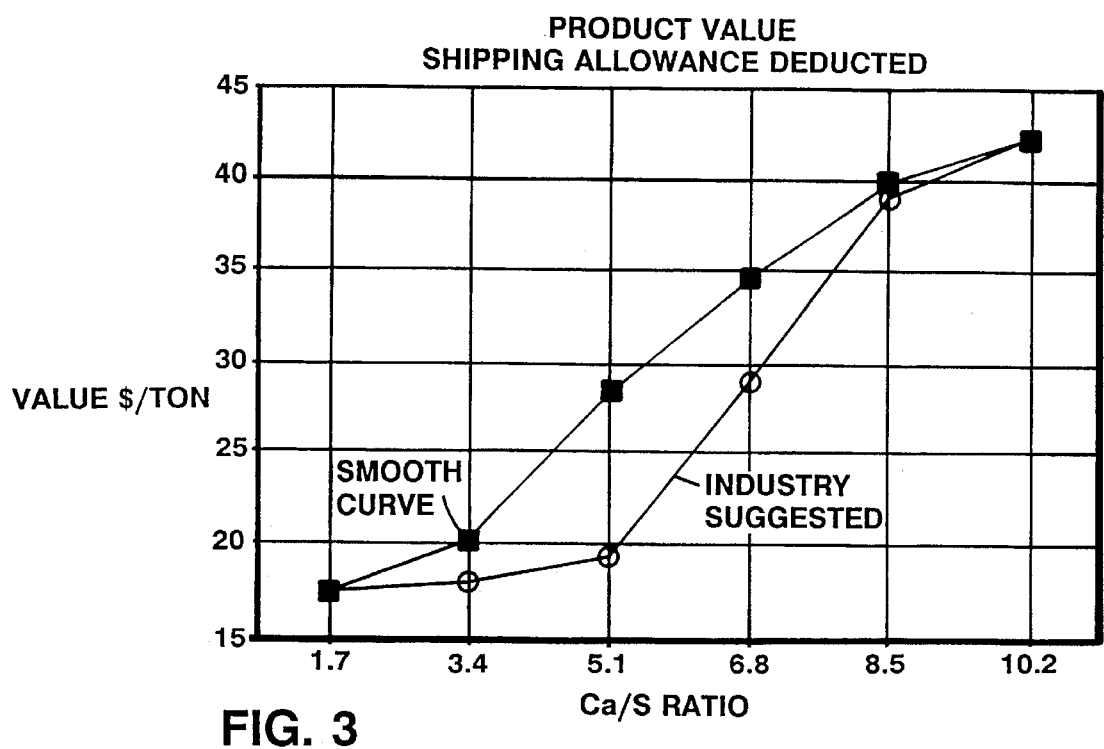
FIG. 3 is a graphical representation of the value in $/hour as a function of the calcium/sulphur ratio in the combustion system.

Referring to FIG. 3, there is shown a graphical representation of the incremental value in $/hour of product created as a function of the Ca/S ratio. The incremental value curve shows that adding enough limestone to double the typical ratio from 1.7 to 3.4 results in no increase in incremental value. It has been discovered that until the free lime, CaO, exceeded 50%, the resultant product would still be undesired ash. However, increasing this ratio above 3.4 progressively increases the incremental value/hour of useful product produced. Balancing the value of the useful product produced against the cost of the limestone and the fuel required to convert the limestone into free lime, CaO, there is an economic benefit above about Ca/S ratios of 4.5/1, and more meaningful economic benefit above 5.5/1.

Thus, by increasing limestone feed by a factor of 4, 5, 6 or even 7, there is a surprising result.

Those skilled in the art of the design and sale of fluid bed boilers regarded ash captured in baghouse and the bed ash as probably a hazardous waste because the ash would contain certain heavy metals from the crude oil typically used to make the coke. Accordingly, economic evaluations typically included a line item of cost reflecting the disposal cost of such ash as would be produced. Thus, the typical prior art approach involved minimizing the quantity of ash produced while meeting the license requirements for meeting pollution standards. Fluid bed ash from coke burning can be utilized as a soil stabilization material in road construction. The value of such ash for that application is slightly above that of the limestone fed to the furnace due in part to the gypsum content of the ash.

By radically increasing the Ca/S ratio according to the invention and examining both the free lime in the resultant ash product and potential value of such new products, it has been discovered that tripling or quadrupling this ratio markedly increased product value. In fact, departing from minimizing ash production to increasing ash production to 5 or 6 times current practice produced a significant beneficial result. Above the 3.4 Ca/S ratio, there is a gradual increase in free lime shown in FIG. 3 in value dollars per hour. It can be shown that by differentially combining the incremental value of the cost of added stone plus added fuel and the increased useful product, there is an economic benefit from very high Ca/S ratios. At a ratio of 8.5, a credit as high as $985/hour can be achieved according to the invention.

Practicing the invention with commercially available fluid bed boilers involves adding a larger component of limestone to the boiler with its air feeder, involving increasing the bed volume sufficiently to accommodate the increased limestone, increasing the limestone feed capacity, and increasing the fuel feeder capacity and ash recovery capability.

With these changes and with a reasonable range of commercial coke and stone prices, the invention results in creating a product competitive with commercial lime, significantly reducing the heavy metals problem in ash and the possibility of producing power at negative cost. With no gas in the compressorless combustion turbine, the expander could generate electrical power at cost ranging from −$0.003 to $0.0015 per kilowatt hour. Without any value for the decrease in SO2, the cycle would produce 60 pounds/hour of SO2 in a plant burning 1,800,000,000 BTU/hr. Operation of fluid bed boilers with Ca/S ratios according to the invention, especially within the range of 5.1–10.2, will result in generating power at significantly lower costs than operating at a ratio of less than 5.1. This advantageous result is available also when using the boilers to operate steam turbines to directly produce power or to create an intermediate product hot compressed air, used to generate electric power from any coal, petroleum coke or other fuel with sulphur.

The novel ash product so produced has value in certain traditional burned lime markets that significantly offsets the cost of the limestone and fuel.

Figure 4:
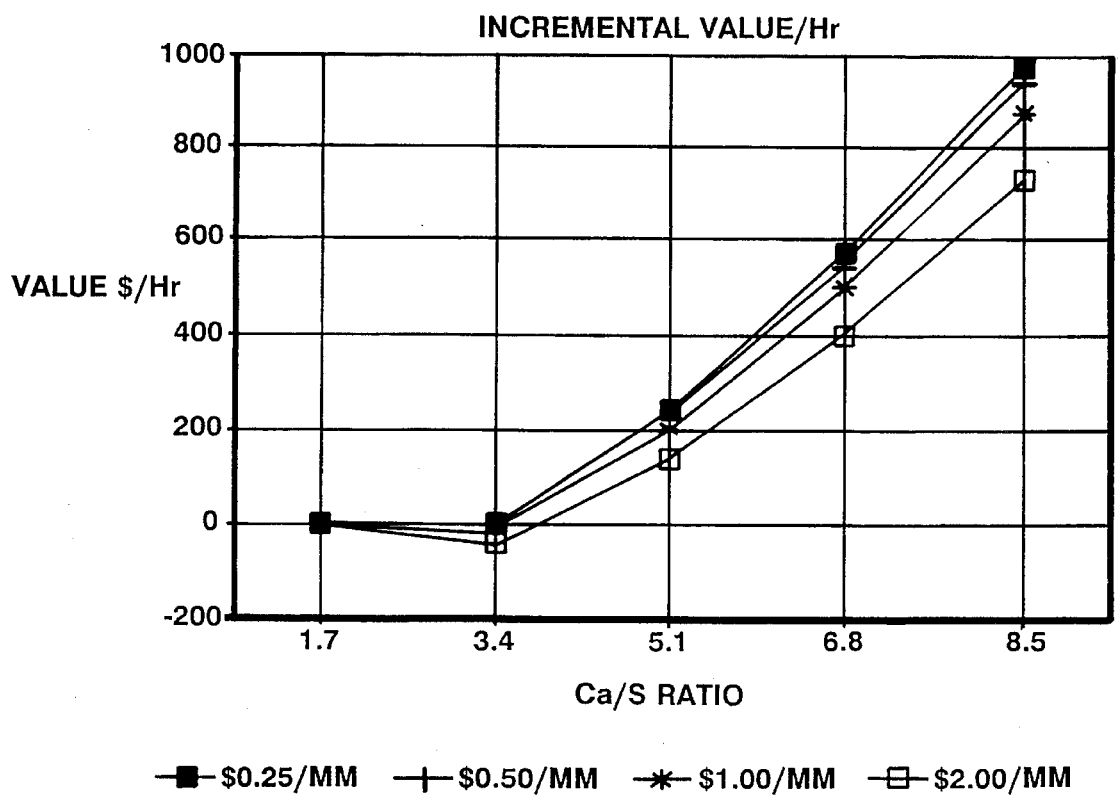
FIG. 4 is a graphical representation of the value in $/ton of product resulting from the combustion process as a function of calcium/sulphur ratio.

Referring to FIG. 4, there is shown a typical expected value in dollars/ton as a function of the Ca/S ratio with shipping allowance deducted.

It is evident that those skilled in the art may now make numerous uses and modifications of and departures from the specific apparatus and techniques described herein without departing from the inventive concepts. Consequently, the invention is to be construed as embracing each and every novel feature and novel combination of features present in or possessed by the apparatus herein described and limited solely by the spirit and scope of the following claims.

What is claimed is:

1. An electric power generation plant comprising, a gas turbine subsystem free of a compressor, a compressor subsystem with an air heater remote from said gas turbine subsystem having an inlet receiving air and an outlet furnishing heated compressed air after heating by said air heater, and a compressed air line interlinking said outlet and said gas turbine subsystem, wherein said gas turbine subsystem comprises, a plenum connected to said compressed air line, a burn chamber having a compressed air inlet connected to said plenum and a fuel inlet, a gas expander connected to said burn chamber, and an electrical generator connected to said gas expander, and further comprising, a steam generator having a heat inlet connected to said gas expander and a steam outlet, a first steam turbine having a steam inlet connected to said steam outlet, and a drive shaft connected to said electrical generator.

2. An electric power generation plant comprising, a gas turbine subsystem free of a compressor, a compressor subsystem with an air heater remote from said gas turbine subsystem having an inlet receiving air and an outlet furnishing heated compressed air after heating by said air heater, a compressed air line interlinking said outlet and said gas turbine subsystem, wherein said compressor subsystem comprises, a boiler having a steam outlet, a compressor turbine having a steam inlet coupled to said steam outlet and a drive shaft, and an air compressor connected to said drive shaft.

3. An electric power generation plant in accordance with claim 1 and further comprising, a heating coil disposed within said boiler intercoupling said compressor and said compressed air line.

4. An electrical power generation plant, comprising, a gas turbine subsystem free of a compressor, a compressor subsystem remote from said gas turbine subsystem having an inlet receiving air and an outlet furnishing compressed air, and a compressed air line interlinking said outlet and said gas turbine subsystem, wherein said gas turbine comprises, a plenum connected to said compressed air line, a burn chamber having a compressed air inlet connected to said plenum and a fuel inlet, a gas expander connected to said burn chamber, and an electrical generator connected to said gas expander, and further comprising, a steam generator having a heat inlet connected to said gas expander and a steam outlet, a first steam turbine having a steam inlet connected to said steam outlet, and a drive shaft connected to said electrical generator.

5. An electrical power generation plant, comprising, a gas turbine subsystem free of a compressor, a compressor subsystem remote from said gas turbine subsystem having an inlet receiving air and an outlet furnishing compressed air, and a compressed air line interlinking said outlet and said gas turbine subsystem, wherein said compressor subsystem comprises, a boiler having a steam outlet, a compressor turbine having a steam inlet coupled to said steam outlet and a drive shaft, and an air compressor connected to said drive shaft, and further comprising, a heating coil disposed within said boiler intercoupling said compressor and said compressed air line.

6. An electrical power generation plant comprising, a gas turbine subsystem free of a compressor, a compressor subsystem free of compressed air storage remote from said gas turbine subsystem having an inlet receiving air and an outlet furnishing compressed air, a compressed air line interlinking said outlet and said gas turbine subsystem, wherein said gas turbine subsystem comprises, a plenum connected to said compressed air line, a burn chamber having a compressed air inlet connected to said plenum and a fuel inlet, a gas expander connected to said burn chamber, an electrical generator connected to said gas expander, and further comprising, a steam generator having a heat inlet connected to said gas expander and a steam outlet, a first steam turbine having a steam inlet connected to said steam outlet, and a drive shaft connected to said electrical generator.

7. An electrical power generation plant comprising, a gas turbine subsystem free of a compressor, a compressor subsystem free of compressed air storage remote from said gas turbine subsystem having an inlet receiving air and an outlet furnishing compressed air, a compressed air line interlinking said outlet and said gas turbine subsystem, wherein said compressor subsystem comprises, a boiler having-a steam outlet, a compressor turbine having a steam inlet coupled to said steam outlet and a drive shaft, an air compressor connected to said drive shaft, and a heating coil disposed within said boiler intercoupling said compressor and said compressed air line.

8. An electrical power generation plant in accordance with claim 3 and further comprising a fluid bed for heating said boiler by burning a fuel having sulphur and constructed and arranged to receive sufficient fuel having sulphur and limestone to reduce SO2 emission go that the Ca/S ratio is greater than 3.4 and sufficiently high to produce an ash product that is more than 50% free CaO.

9. An electrical power generation plant in accordance with claim 8 wherein said Ca/S ratio is within the range of 5.1 to 10.2.

10. An electrical power generation plant in accordance with claim 9 wherein said Ca/S ratio is substantially 8.5.

11. An electrical power generation plant comprising, a boiler having a steam outlet and a fluid bed for burning a fuel having sulphur content, said fluid bed constructed and arranged to receive sufficient fuel having sulphur and limestone for reducing SO2 production so that the ratio of Ca/S is greater than 3.4 and sufficiently high to produce an ash product that is more than 50% free CaO.

12. An electrical power generation plant in accordance with claim 11 wherein said Ca/S ratio is within the range of 5.1 to 10.2.

13. An electrical power generation plant in accordance with claim 12 wherein said Ca/S ratio is substantially 8.5.

14. A method of generating electrical power with a boiler having a steam outlet including, burning sufficient fuel having sulphur content with sufficient limestone to establish a Ca/S ratio greater than 3.4 and sufficiently high to produce an ash that is more than 50% free CaO.

15. A method in accordance with claim 14 wherein said Ca/S ratio is within the range of 5.5–10.2.

16. A method in accordance with claim 15 wherein said Ca/S ratio is substantially 8.5.

* * * * *